Oct. 14, 1930.  H. E. MEYER  1,778,533
PORTABLE MATERIAL HANDLING DEVICE
Filed July 13, 1928    2 Sheets-Sheet 1
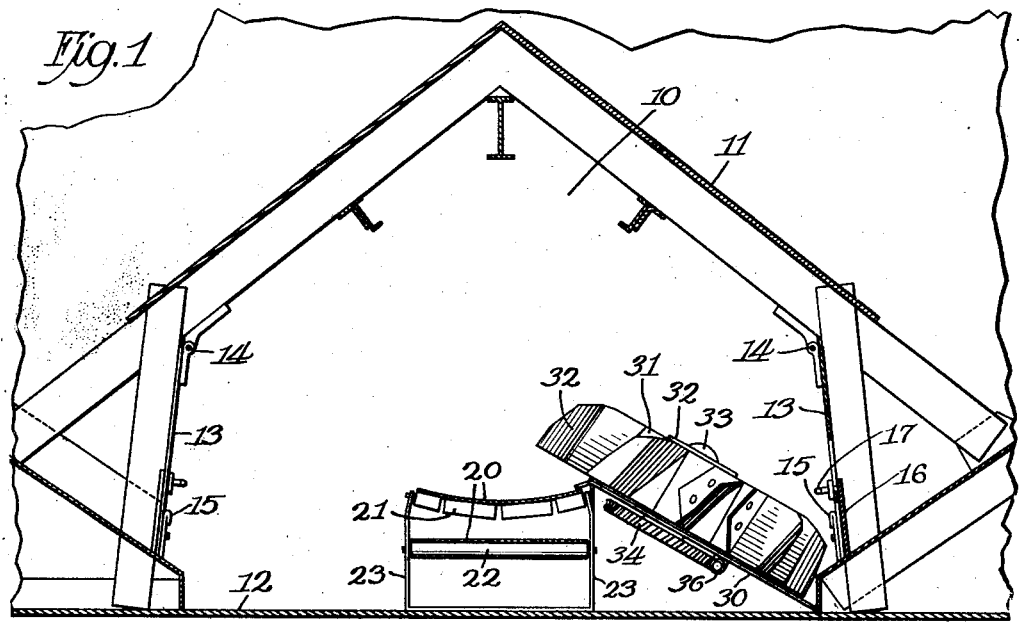
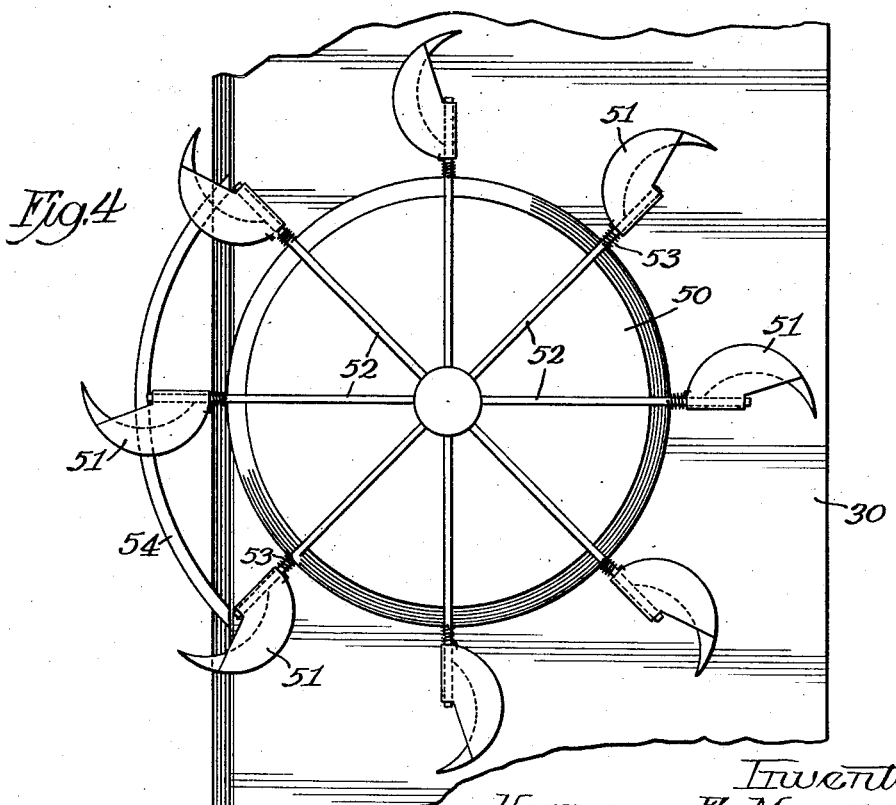
Inventor:
Herman E. Meyer
By Rector, Hibben, Davis, & Macauley Attys.

Oct. 14, 1930.                H. E. MEYER                1,778,533
                   PORTABLE MATERIAL HANDLING DEVICE
                     Filed July 13, 1928    2 Sheets-Sheet 2
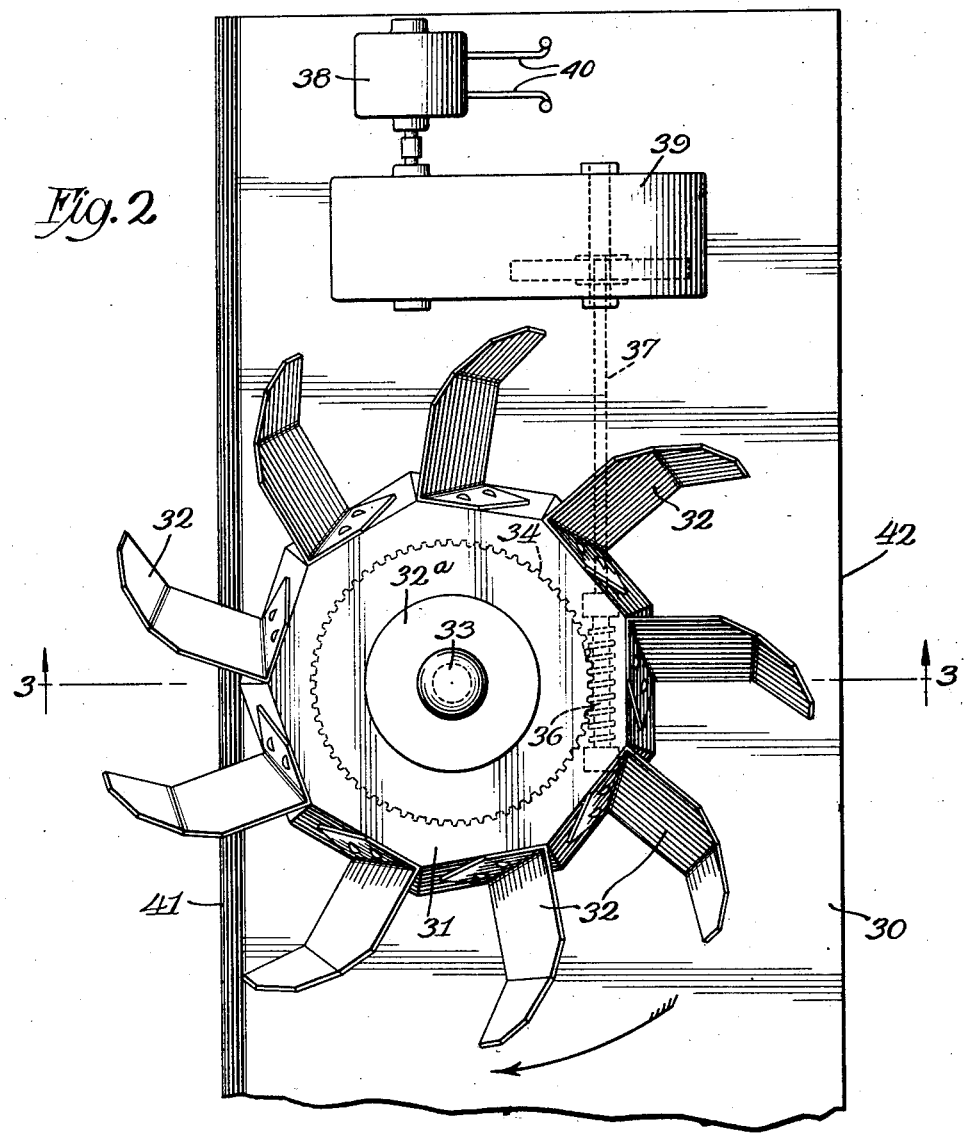
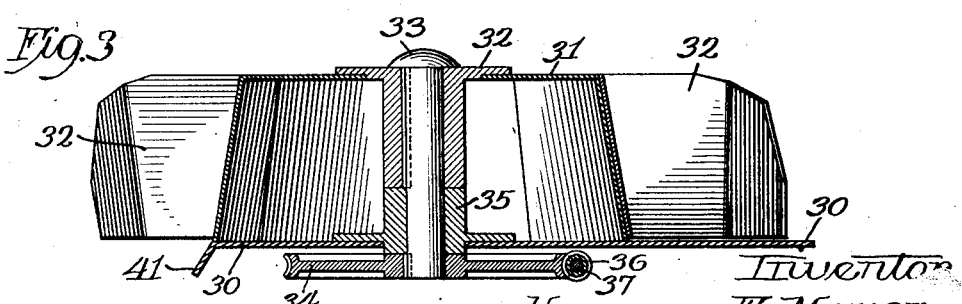
Inventor
Herman E. Meyer
By Rector, Hibben, Davis, & Macauley Attys.

Patented Oct. 14, 1930

1,778,533

UNITED STATES PATENT OFFICE

HERMAN E. MEYER, OF CHICAGO, ILLINOIS

PORTABLE MATERIAL-HANDLING DEVICE

Application filed July 13, 1928. Serial No. 292,421.

This invention relates to a method of unloading vessels and to a portable material handling device therefor.

Many of the ships used for hauling grain and similar cargoes have one or more tunnels running throughout their length underneath the cargo, through which tunnels the ship may be unloaded. The roofs or sides of these tunnels have doors located at various points which, when opened, allow the grain or other material to flow into the tunnel from which it may be removed to the hatchways and hoisted to the surface. The method now employed to get the cargo out of the tunnels is to use a drag scraper and, while this operates fairly well for cargo near the hatchways, it is slow and relatively expensive for removing cargo from points in the tunnel distant from the hatchways, because the empty drag bucket has to be moved back to the rear of the tunnel at each operation. The present invention has been devised to overcome this difficulty and it comprehends a method of unloading in which a portable loading device is used in combination with a belt conveyor to unload vessels without the usual loss of time that occurs with the use of drag scrapers, said invention also serving to materially reduce unloading costs as will hereinafter appear.

The object of the invention is to provide a new method of unloading vessels through tunnels located near the bottoms of the vessels.

Another object is to provide a new portable loading device for loading material onto a belt conveyor.

Other objects and advantages of the invention will appear from the following specification and drawings.

An embodiment of the invention is shown in the accompanying drawings in which:

Figure 1 is a sectional elevation of a tunnel in the bottom of a vessel, showing a belt conveyor and the novel loading device used therewith;

Fig. 2 is a plan view of the loading device shown in Fig. 1;

Fig. 3 is a section of the loading device on the line 3—3 of Fig. 2;

Fig. 4 is a partial plan elevation of a modified form of loading device.

The invention is shown applied to a vessel, a partial section of the bottom of which is illustrated in Fig. 1. A tunnel 10 having a roof 11 extends along the vessel near the bottom 12 thereof. At appropriate points along the tunnel doors 13 are provided which are pivoted at 14 and held closed by suitable latches 15. These doors, when open, admit the grain or other material comprising the cargo into the tunnel from which the material is removed to the hatchway and hoisted to the surface. Instead of opening the doors, sliding gates 16 may be pulled upward by handles 17 to allow the material to flow into the tunnels through small openings in the doors. The tunnel is quite long, particularly in lake vessels of the whale-boat type, and the distance from some of the doors 13 to the hatchway is quite considerable.

Instead of allowing the cargo to flow into the tunnel and then removing it by drag scrapers, a belt conveyor is mounted along the tunnel near the center thereof and throughout its length, said conveyor comprising an endless belt 20 running over top rollers 21 and returning over lower rollers 22, said rollers being supported in a suitable frame 23.

In order to load the cargo onto the belt conveyor so that it may be conveyed to the hatchways, a novel portable loading device has been provided which may be positioned adjacent any of the doors 13 to load the material flowing into the tunnel at that point onto the belt conveyor. After this portion of the cargo is loaded, the device is moved to the next door and used for loading the material at that point and so on from door to door.

The loader comprises a plate 30 which is supported in an inclined position, the support, in the form of the invention illustrated, being obtained by resting one edge of the plate on the frame 23 of the belt conveyor and allowing the other end to rest on the floor of the vessel. Rotatably mounted on the top of this plate is a member 31 having a plurality of curved arms 32 attached to it.

This member is attached to a bushing or sleeve 32$^a$ which, in turn, is fixed to a drive shaft 33 having a worm wheel 34 fixed to its lower end. The shaft 33 is journaled in a bearing 35 carried by the supporting plate 30. The worm wheel 34 is driven by a worm 36 on the end of a shaft 37 driven by a motor 38 through a change-speed mechanism enclosed in the housing 39, the change-speed mechanism not being shown, any suitable form being usable. The motor is preferably an electric motor and both the motor and the change speed mechanism are preferably carried by the plate 30 so that the whole unit can be easily moved about, the leads 40 for the motor being made long enough to extend from the power supply to the end of the tunnel.

The rotatable member 31 is mounted on the plate 30 so that the arms 32 extend over the top edge 41 of the plate, but are inside of the bottom edge 42 of said plate as illustrated in Fig. 2. When the plate 30 is supported in an inclined position the arms at the lower side are above the floor of the vessel and in a position where they may freely rotate and yet they are in a position where they may scoop up material from a pile at the lower side of the plate. When the member 31 is rotated, the arms 32 plow through the pile of material and carry portions of it upwardly along the surface of plate 30 and drop it over the edge of the plate onto the belt conveyor as will be readily understood by an examination of Figs. 1 and 2.

In unloading vessels according to the method herein disclosed and in the use of the portable loading device, the belt conveyor is first placed in the tunnel 10. The unloading device is then placed in position near one of the doors 13 after which either the door or the slide 16 is opened and the cargo allowed to flow down onto the lower portion of the unloading device. The latter is then set into operation which rotates the member 31 clockwise as viewed in Fig. 2. As this member rotates its arms 32 pick up portions of the cargo and carry them upwardly on the plate 30 until they are discharged over the edge of said plate onto the belt 20 which carries them forward to the hatchway. After the material that flows out of the first doorway has been loaded onto the conveyor and transported to the hatchway, the portable loading device is moved along the tunnel to the next opening and the material that flows into the tunnel from said opening is loaded onto the belt conveyor in the same way. It will be appreciated that, with this device, the loading of the material is a continuous operation and no time is lost in pulling an empty drag bucket from the hatchway to the end of the tunnel. Also, all the power used for operating the device is used for loading and transporting the cargo, none being lost in dragging an empty bucket in the tunnel. The portable loading device is very easily handled, it may be pushed along a belt conveyor to different positions either at the doorways or between them, and it consumes relatively little power. Although it is particularly applicable to loading material onto a belt conveyor in the unloading of ships in the manner described, it may also be used for other purposes for loading material onto a conveyor as will be readily understood.

A modified form of the loading device is illustrated in Fig. 4, the modification consisting principally in a change in the form of the arm or scoop carried by the rotatable member on top of the plate 30. The rotatable member 50 is circular in this case and the arms or scoops 51 for carrying the material upwardly are crescent shaped and rockably mounted on the ends of rods 52 fixed to member 50. The crescent shaped scoops 51 are urged by springs 53 in a direction to contact the plate 30. They thus scrape along the plate and drag the material upwardly in the same manner as the arms 32 illustrated in Fig. 2. However, because of the spring mounting, these scoops will yield when they strike an obstruction, in which event, they will raise up and ride over the obstruction without picking it up or damaging the loading device. As the scoops pass over the top edge of plate 30 they ride over a semi-circular rib 54 which prevents them from turning and thereby causes them to discharge their load.

It is to be understood that the structure shown is for purposes of illustration only and that variations may be made in it without departing from the spirit and scope of the invention as defined by the appended claims.

I claim:

1. A portable material loading device comprising a flat metal plate one edge of which is adapted to rest on the frame of a belt conveyor and the other on a floor or similar surface whereby the plate is supported on an inclined position, a member rotatably mounted on top of said plate, driving means for rotating said member, and a plurality of curved arms extending outwardly from said rotatable member, said rotatable member being mounted so that, as it is rotated said arms pass over the top edge of said plate and within the lower edge thereof.

2. A portable material loading device comprising a flat metal plate having one of its edges bent to form a retaining edge for retaining the plate in position on a support on which it may be rested, said inclined edge also forming a discharge surface for the material to be loaded, the other edge of said metal plate being adapted to rest on a floor or the like, a member rotatably mounted on the top side of said plate, driving means for said member supported by said plate, and a plurality of curved arms extending outwardly from said rotatable member, said rotatable member being mounted so that, as it is rotated, said arms pass over the top inclined edge of said plate and within the lower edge thereof.

3. A portable loading device comprising a portable flat plate adapted to be supported in inclined position, a device mounted to rotate on top of said plate, means for rotating said device, a plurality of curved lifting arms supported by said rotatable device, means for yieldingly urging said arms into contact with the face of said plate, said rotatable device being mounted on the plate so that as it is rotated said arms pass over the top edge of said plate and inside the bottom edge thereof, and means for conditioning the arms to engage the plate after passing over the top edge of the latter.

4. The combination with a storage space having a portion of its bottom shaped to form a tunnel beneath said space, and a plurality of controlled openings in said bottom spaced longitudinally of the tunnel through which material may be discharged toward the floor of the latter, of a conveyor unit extending longitudinally of the tunnel and including a frame and an endless conveying means supported by the frame and a portable conveying means supported on the conveyor unit frame and the tunnel floor for movement along said tunnel to be registered selectively with said controlled openings, said portable conveying means including mechanism for transferring material discharged from an opening onto said endless conveying means.

5. A portable material loading device comprising a self-contained unit having a flat metal plate adapted to be supported in an inclined position with its top edge projecting over a material receiving device and its bottom edge closely adjacent a floor on which material to be loaded is discharged, a member rotatably mounted on top of said plate, a plurality of curved arms extending outwardly from the periphery of said rotatable member, and power-operated means acting to rotate said member in a direction to cause said arms to act as scoops, said rotatable member being mounted on said plate so that as said member is rotated, said curved arms pass over the surface of said plate in contact therewith, said arms passing within the lower edge of said plate but closely adjacent thereto and portions of said arms passing over the top edge of said plate.

6. In an unloading mechanism for ships, the combination with a storage space having a portion of its bottom shaped to form a tunnel beneath said space and a plurality of controlled openings in said bottom spaced longitudinally of said tunnel through which openings material may be discharged toward the floor of the tunnel, of a conveyor unit extending longitudinally of said tunnel and including a frame and an endless conveying means supported by said frame, and a portable loading device adapted to be positioned along said conveyor frame, said loading device comprising a self-contained power driven unit having an inclined supporting plate provided with a top edge adapted to rest on said frame and to project over said conveying means and a bottom edge terminating near the floor of the tunnel, a member mounted to rotate on said plate, means for rotating said member, said member having a plurality of curved arms attached to it so that as said member is rotated said arms pass over the top edge of the plate and inside the bottom edge thereof.

In testimony whereof, I have subscribed my name.

HERMAN E. MEYER.